Figure 1:
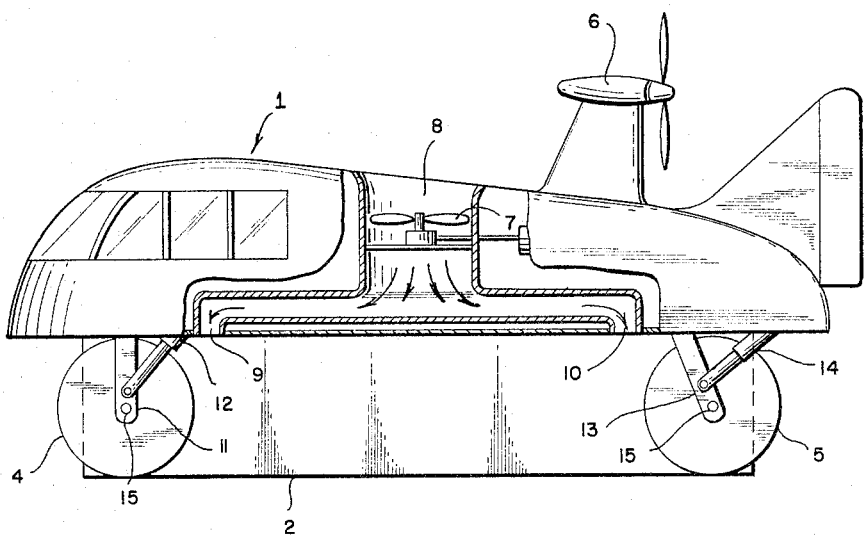

Oct. 4, 1966   C. H. LATIMER-NEEDHAM   3,276,529
GROUND EFFECT VEHICLES

Filed June 11, 1964   4 Sheets-Sheet 1

BY Larson and Taylor
ATTORNEYS

BY *Larson and Taylor*

ATTORNEYS

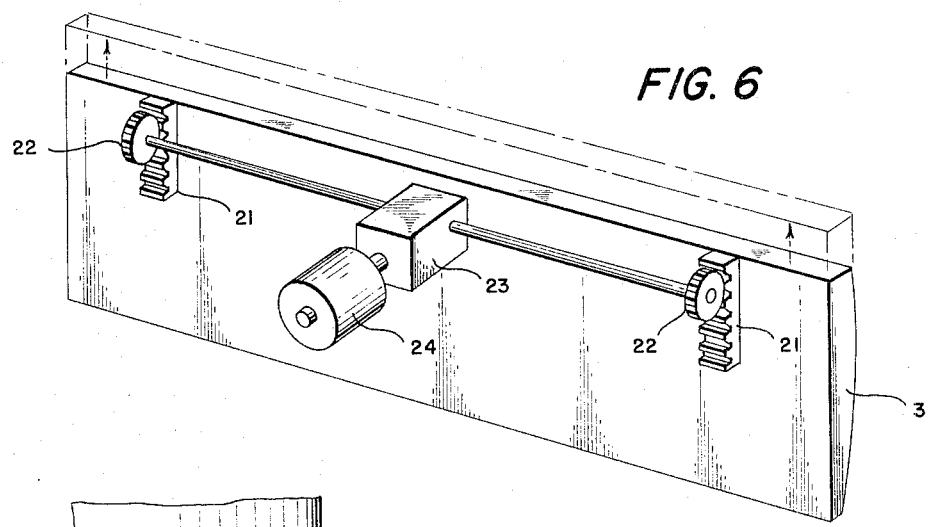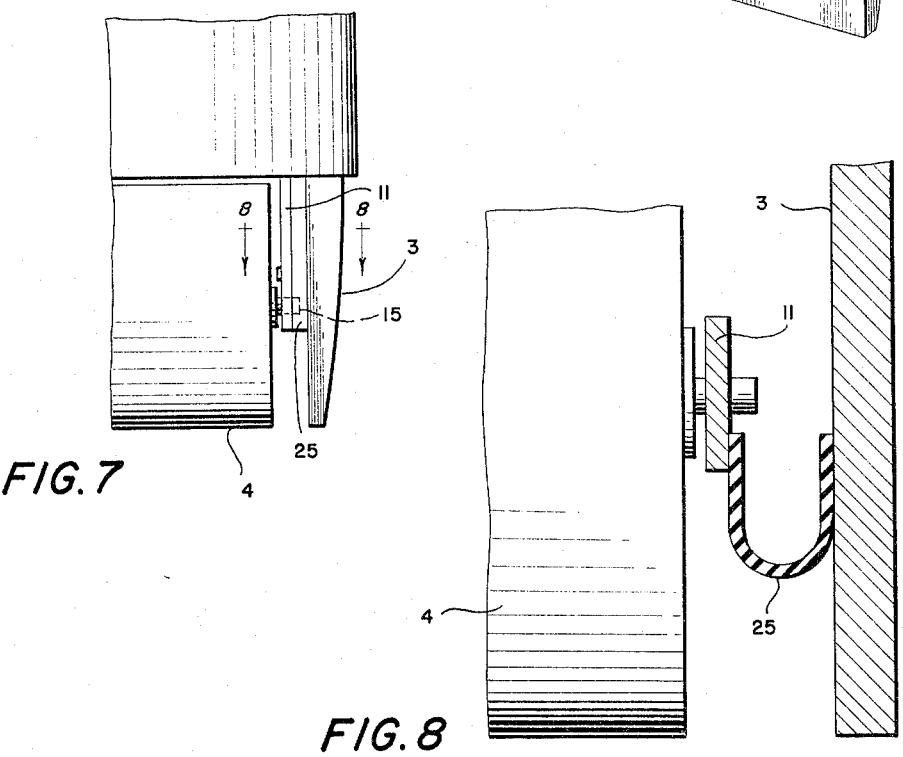

United States Patent Office 3,276,529
Patented Oct. 4, 1966

3,276,529
GROUND EFFECT VEHICLES
Cecil Hugh Latimer-Needham, Wonersh, near Guildford, England, assignor to Westland Aircraft Limited, Somerset, England
Filed June 11, 1964, Ser. No. 374,394
Claims priority, application Great Britain, June 18, 1963, 24,135/63
8 Claims. (Cl. 180—7)

This invention relates to improvements in machines or vehicles of the type which employ a pressurized gas cushion or cushions to wholly or partially support the vehicle above the surface over which it is hovering or moving. Various forms of such vehicles have been proposed in which a cushion of pressurized gas is maintained between the ground, water or other surface and the underside of the vehicle to wholly or partially support the vehicle, and these machines are generally known in the art as "ground effect machines."

For obvious practical reasons in the operation of such machines, it is desirable in most cases to maintain the pressurized gas supporting cushion of such a depth as to have the main structure of the vehicle ride at a practical clearance above the surface over which the vehicle is operating. One of the more substantial problems encountered in the design and operation of these vehicles relates to the retention of the pressurized gas cushion or cushions beneath the vehicle, which problem is increased or multiplied as the depth of the supporting cushion increases. This invention is directed toward an arrangement for reducing or minimizing this loss of pressurized gas from the supporting cushion.

It has already been proposed in ground effect machines to employ the momentum of a fluid to retain the pressurized cushion of air, the fluid being utilized in the form of a fluid curtain around part or all of the pressurized supporting cushion. While this arrangement presents several advantages and desirable features, it is subject to the disadvantages of requiring a relatively large amount of power to pressurize the curtain fluid and a relatively large amount of space for containing the requisite ducting. Also, to increase the ground clearance of ground effect machines while minimizing loss of cushion air, various forms of flexible skirt members have been utilized to depend from the base structure of the machine and form flexible physical barriers around part or all of the pressurized supporting cushion. Finally, to retain the pressurized cushion of air beneath water based ground effect machines, the machines have been provided with side walls which depend from the main structure and create a longitudinal physical seal between the underside of the vehicle and the water. One such embodiment of side walls is disclosed in British Patent No. 935,531. However, such side wall machines have generally been limited to operation over water, and have been subject to the added disadvantage of substantial losses of cushion air at points around the base structure of the machine which are not sealed by the longitudinal side walls.

In ground effect machines having either rigid or flexible skirts depending from the base structure, difficulties are often encountered because of obstructions which project above the general surface over which the vehicle is traveling. While properly constructed flexible skirts tend in many instances to fold or give way and pass over the obstruction, in some instances there is a tendency for the skirt to be torn or damaged or to become temporarily hooked in some projecting obstruction. In cases where the skirt is rigid or where the main base structure rides relatively close to the surface, these abrupt obstructions or projections prevent even more substantial difficulties, especially where a rigid skirt may extend transversely across the width of the machine. While the side wall members of a side wall type machine do not extend transversely across the width of the vehicle, and thus minimize this problem to some extent, this is accomplished at the expense of pressure tightness of the supporting air cushion.

While this invention relates generally to ground effect machines and to arrangements for minimizing air losses from the pressurized supporting cushion without increasing the difficulties created by encountered obstacles or obstructions, it relates more particularly to a machine of the side wall type wherein air losses from the pressurized supporting cushion are reduced or minimized without attendant difficulties due to abrupt projections or obstructions in the path of the vehicle, and without the common difficulties which often accompany the use of flexible skirts.

Accordingly, it is an object of this invention to provide such a machine embodying features minimizing retardation of movement and/or damage to the machine due to obstacles in the path of the vehicle.

It is a further object of this invention to provide apparatus which minimizes the leakage of air from the pressurized gas supporting cushion between the ground, water or other surface over which the vehicle is operating and the base structure of the vehicle.

It is a further object of this invention to provide a ground effect machine capable of efficient and economical operation over both land and water.

With the foregoing objects in mind, the invention comprises a ground effect machine comprising a load carrying platform provided with at least two depending side walls between which the longitudinal center line of the vehicle passes, one or more transversely disposed rollers extending between the depending side walls, whereby the side walls and the roller or rollers define boundary sides of a pressurized gas supporting cushion under the base structure. Preferably two or more such rollers are provided so as to completely enclose the pressurized gas cushion area, the rollers themselves preferably being formed from a flexible material and being inflated to a relatively low pressure. The rollers are preferably pivotally mounted so as to give way in the face of encountered obstacles, and means are provided to urge the rollers back to their extended position after the obstacle has been cleared. In order to minimize cushion air losses between the upper surface of the roller and the base structure of the vehicle pressurized cushion air preferably is supplied to the supporting cushion in the form of a fluid curtain extending transversely across the base structure of the vehicle between the transverse center line of the base structure and the clearance space between the roller and the base structure. The elongated nozzle for producing this fluid curtain can be extended below the base structure of the vehicle in the form of a hollow flexible member having an elongated nozzle along its lower edge. Appropriate sealing arrangements are provided to the most practical extent between the ends of the roller or rollers and the inner surfaces of the depending side walls, these sealing arrangements being flexible or yieldable so as to permit pivotal movement of the rollers and vertical extension or retraction of the side walls.

Referring now to the accompanying drawings for a more detailed description of an exemplary embodiment or exemplary features of the invention.

Figure 2:
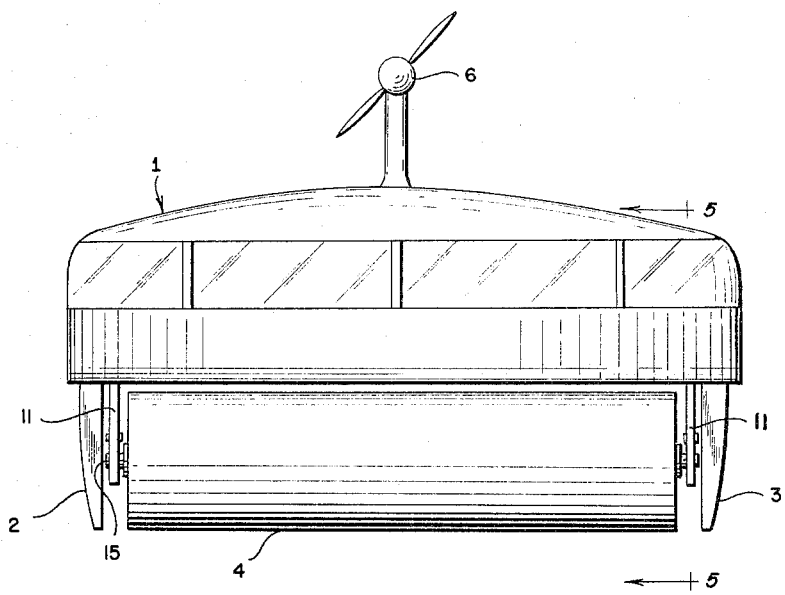
Figure 3:
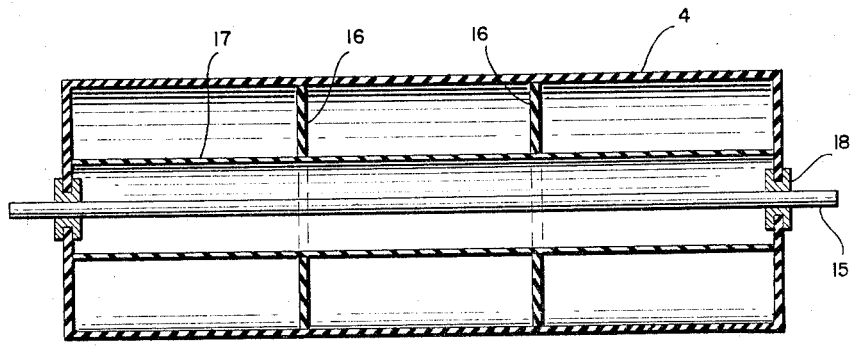
Figure 4:
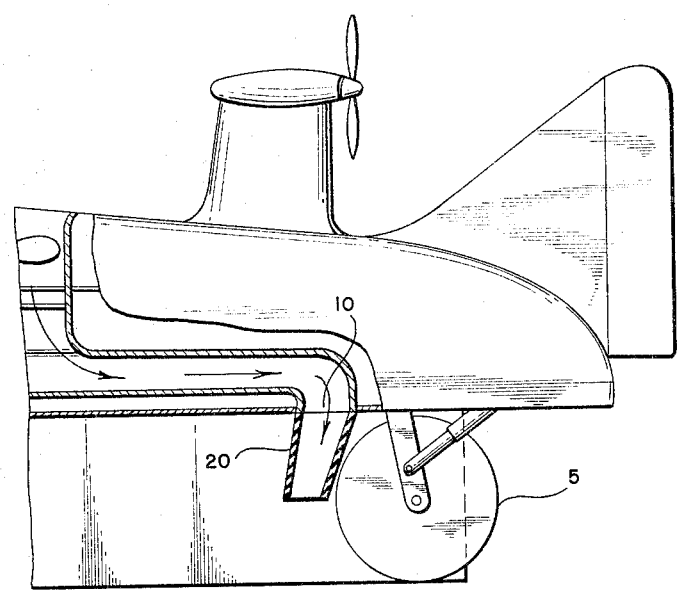
Figure 9:
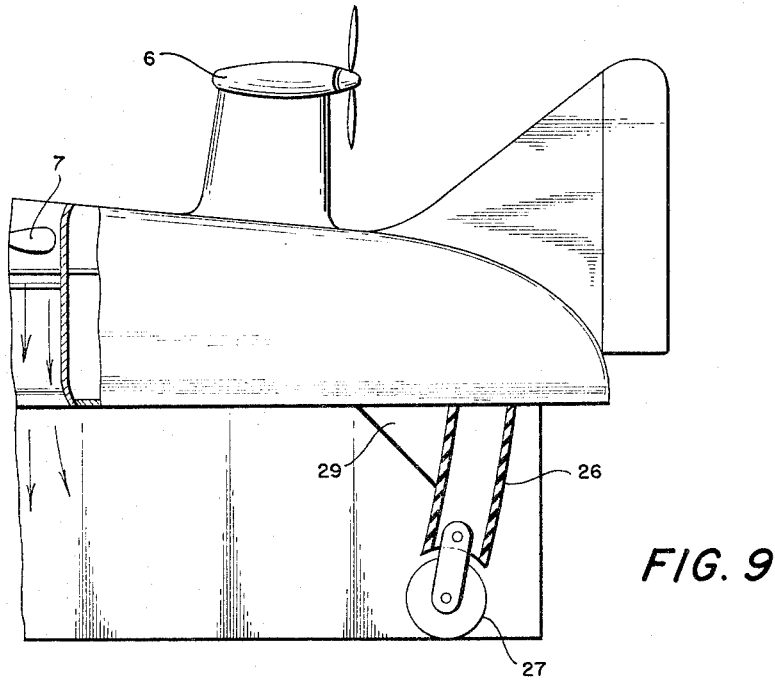
Figure 5:
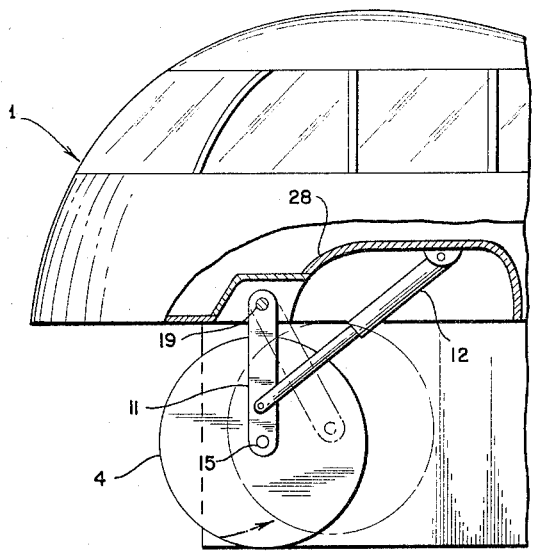

FIG. 1 is a side view with parts broken away of a side wall machine employing fore and aft transverse rollers according to the invention, FIG. 2 is a front view of the machine shown in FIG. 1, FIG. 3 is a sectional view showing the details of an exemplary roller constructed according to the invention, FIG. 4 illustrates the manner in which the nozzle for supplying the pressurized supporting air may be flexibly extended downwardly to enhance the effectiveness of the sealing arrangement, FIG. 5 is a view partly in section of the front part of an exemplary machine showing the manner in which the inflated roller may be mounted to the base structure so as yieldably to pivot upon encountering an obstacle, FIG. 6 is an illustration of an exemplary arrangement for retracting and extending the side walls of the machine, FIGS. 7 and 8 are respectively a front view and a plan sectional view illustrating an exemplary sealing arrangement between the roller supporting arms and the side walls of the machine, FIG. 9 illustrates an embodiment of the invention utilizing a smaller roller in conjunction with a flexible skirt-like member for supporting the roller.

Referring first to FIGS. 1 and 2, the main load carrying platform structure or base structure of the machine is generally labeled 1, and has longitudinally extending side wall members 2 and 3 depending from the outer edges thereof. Transverse rollers 4 and 5 are pivotally mounted to the base structure by arms 11 and 13, and these arms are resiliently urged to the extended positions shown in FIG. 1 by hydraulic or spring operated members 12 and 14. Members 12 and 14 can take the form of shock absorbers of known types, utilizing either springs or hydraulic pressure or a combination of these to yieldably urge the roller supporting arms to their normal positions. Rollers 4 and 5 are mounted upon axles 15 which in turn are journaled in the lower ends of arms 11 and 13. The two rollers combine with the depending side walls to define an open-bottomed box into which pressurized air is ducted to form the supporting cushion for the vehicle. Air for the supporting cushion is drawn into intake duct 8 by blower 7, which is driven from engines carried in the base structure of the vehicle in a manner well known in the art. Preferably the pressurized air from blower 7 is forced into the supporting cushion area through elongated nozzle openings 9 and 10 which open downwardly across the base structure of the vehicle between the inner surfaces of the depending side walls. The pressurized air issues from these nozzle openings in the form of a fluid curtain, and the nozzle openings are arranged so as to lie transversely of the base structure adjacent to but inwardly of the clearance space between the upper surfaces of the rollers and the lower surface of the base structure. Thus these fluid curtains tend to reduce or minimize the possible loss of cushion air through these clearance spaces.

The air rollers preferably are in the form of inflatable cylinders made of impermeable flexible material, such as rubberized or impregnated fabric. As shown in FIG. 3, the cylinders are closed at both ends, and preferably an inner sleeve of the same or a similar material extends between the ends of the main cylinder so as to prevent or minimize possible bulging longitudinally outwardly of the end material of the main roller. Inner cylinder 17 may be replaced if desired by individual ties which would similarly avoid undue curvature of the end material, or alternatively the ends of the main roller could be formed from a relatively stiffer flexible material which in itself would avoid undue curvature. Inner radial diaphragm members 16 are provided at spaced points along the main cylinder to brace the outer wall of the main cylinder against undue bulging or outward curvature, thus maintaining the outer surface of the main cylinder in a straight line to the extent that this is possible. Diaphragm members 16 may be incorporated in any desired number, and preferably are formed from substantially the same material as the main roller. Axle 15 preferably passes completely through the main roller and is clamped to the end portions of the main roller by clamping members 18, which can take the form of spaced discs having means for clamping the flexible end material therebetween. In those cases where the entire inner space of the main roller is pressurized, clamping members 18 should be sealed to shaft 15 in any of several pressure tight manners which are well known in the art. When inner cylinder 17 is formed of an impermeable material, then appropriate openings should be provided therein so as to permit the entire space inside main cylinder 4 to be pressurized.

The air rollers may be inflated by any suitable means, the particular inflation arrangement forming no part of the instant invention. For instance, an air passage may be provided through the interior of the axle 15 to the space inside the cylinder 4. In those instances where it may be desired to provide for varying the pressure inside the roller during operation of the vehicle, an appropriate gland joint could be provided in the arms 11 where the axle 15 is journaled. Alternatively, the axle 15 could be journaled inside clamping members 18, and appropriate gland joints could be provided at clamping members 18 to permit variation in pressure inside the rollers during operation of the vehicle. The inflation pressure of the rollers should be varied with different operating conditions and with different materials from which the rollers may be formed, but in general the pressure inside the rollers is preferably of the order of 1 to 10 p.s.i. To avoid excessive pressure from building up in the air rollers due to indentation caused by encountering obstacles, valve-controlled air exit means may be provided in the rollers, together with means for reinflating the rollers during operation from an air reservoir or air supply pump.

FIG. 4 shows a hollow flexible skirt-like member 20 communicating with the elongated transverse duct 10 and depending downwardly from the base structure of the vehicle so as to form the fluid curtain at a point below the clearance space between the upper edge of the roller 5 and the lower surface of the base structure. This arrangement employs some advantages over the corresponding arrangement shown in FIG. 1 especially in cases where the clearance is substantial.

FIG. 5 shows in more detail how a roller 4 may be pivotally mounted to the base structure of the vehicle. Thus arm 11 is pivoted about pivot point 19 so as to permit roller 4 to swing counterclockwise as viewed in FIG. 5 upon encountering a projecting obstacle. In order to permit roller 4 to pivot rearwardly to a greater extent upon encountering larger obstacles, but without unduly increasing the clearance space between the roller and the base structure, a receiving well preferably is formed in the lower surface of the base structure to partially receive the roller when it is pivoted rearwardly to a substantial extent. Such a well is formed by wall 28 in the general manner shown in FIG. 5, this wall of the receiving well being constructed so as to conform generally with the path followed by the upper surface of the roller 4 as the roller is pivoted about the axis 19. This construction maintains the clearance space between the roller and the base structure at approximately the same dimensions as the roller moves about its pivot point.

The side wall members of the machine may be extensible and retractable to allow for adjustment of their height to suit prevailing conditions. For example, for use over water the side walls may be in the low position, or even lower than the lower extremities of the air rollers. Because of their alignment with the fore and aft axis of the vehicle, their resistance to motion through water will be small, and it may be convenient for the bottom edges of the side walls to be immersed, or partly so, in order to minimize escape of cushion air. For progression over ground, relatively short side walls are often desirable, and thus the side walls may be retracted to a convenient height depending upon the nature of the ground surface. An exemplary arrangement for retracting and extending the side wall members is shown in FIG. 6. Rack gears 21 and 22 may be provided on the side wall member 3 to cooperate with pinions 22 which are driven by an electric motor 24 through a gear box 23. The gear box and the driving motor obviously would be fixed to the base structure of the vehicle.

In order to minimize air cushion losses to a practical extent, a flexible or yieldable sealing arrangement should be provided to seal the space between the roller supporting arms and the inner surfaces of the side wall members. An exemplary arrangement is shown in FIGS. 7 and 8 where an elongated flexible member 25 is shown as being folded over and fixed at its respective longitudinal edges to the inner surface of a side wall member 3 and the outer surface of a roller supporting arm 11. By using such a flexible and folded member, the seal can be maintained during pivotal movement of the roller supporting arm, and member 25 will be so proportioned as to permit pivotal movement of the roller supporting arm to the design limit. Members 25 can be fixed to the respective surfaces in any convenient manner, but preferably the method of attachment should be such as to permit replacement of members 25 if they should become damaged. A bolted clamp attachment is quite suitable.

For use in areas where the obstacles which reasonably can be expected to be encountered are not such as to call for the use of large rollers of the type previously described, but which are such as possibly to create undue wear and tearing of flexible skirts of standard design, the arrangement shown in FIG. 9 can be substituted for or used in conjunction with the larger inflated rollers previously described. The arrangement of FIG. 9 comprises an impervious flexible skirting member depending downwardly from the base structure of the vehicle and having one or more rollers 27 carried at the lower edge thereof. Flexible diaphragm-like retaining members 29 can be incorporated to extend between the base structure of the vehicle and the flexible skirting member 26 to provide support for the skirting member against outward movement due to the pressure of the pressurized supporting cushion. The small roller 27 will function in much the same manner as the larger rollers previously described upon encountering relatively small obstacles, whereas it will tend to minimize or reduce the possibility of damage to the skirting member 27 upon encountering larger obstacles. Because of the better seal which is accomplished by the skirting member 26, the use of a fluid curtain in the manner previously described is generally unnecessary. However, by forming the flexible skirting member 26 as two spaced flexible walls connected by vertically extending flexible diaphragms, the flexible skirting member if desired can be used as a flexible conduit so as to permit pressurized fluid to be conducted therethrough for discharge as a fluid curtain in the vicinity of the small roller 27, the fluid curtain preferably being directed on the inward side of the small roller.

The manner of operation of a machine according to the invention will be apparent to those skilled in the art from the foregoing description and illustration of an exemplary embodiment. Upon contact with relatively small obstacles the inflated rollers will roll about their axes and give way slightly inwardly so as to minimize the retarding effect against forward movement which normally would be created by encountering the obstacle. Upon encountering larger obstacles the inflated rollers will also function in this manner, but in the preferred embodiment they also will pivot about their points of attachment to the base structure of the machine so as to clear the larger obstacle without substantially retarding the forward movement of the machine and without any substantial loss of cushion pressure.

While the rollers will operate satisfactorily due to their freely rotatable mountings, in some instances it may be desired to provide driving arrangements for the rollers. Such arrangements could take the form of belt and pulley drives or chain and sprocket drives, the belt or chain extending downwardly along the roller support arms 11 and 13. Also, it may be desired for some applications to make the rollers themselves vertically adjustable, and this can conveniently be accomplished by incorporating an adjustable hydraulic piston and cylinder arrangement in the roller supporting arms, with hydraulic fluid lines leading to a convenient point of control in the base structure of the vehicle. Where it is desired to control the pivot positions of the rollers about their pivot axes, simple flexible tension members, such as cables, can extend between the lower ends of the roller support arms and a simple winding mechanism in the base structure of the vehicle so as to permit the rollers to be pivotally retracted against the force of the shock absorbers, or alternatively an overriding hydraulic piston and cylinder arrangement could be incorporated in the shock absorbers themselves so as to permit varying of the effective length of the shock absorbers. It may be found desirable to utilize such arrangements to raise or pivot the forward roller to allow ingress of air at ram pressure to the pressurized gas cushion during periods of high operational speed. For machines that are intended to be used primarily over ground as opposed to water, flexible bottom extensions for the side wall members will be advantageous.

It will be apparent to those skilled in the art that the particular embodiment or embodiments illustrated and described herein are susceptible of various modifications without departing from the concept and spirit of the invention. Therefore, it should be understood that the foregoing particular embodiment or embodiments are to be taken as exemplary of the invention, and that the invention is to be limited only by the subjoined claims as interpreted in the light of the foregoing specification.

Having thus fully described my invention in the manner required by the statute, I claim:

1. A ground effect machine comprising a platform-like base structure, two spaced side wall members depending downwardly from said base structure on opposite sides of and extending in the direction of the longitudinal center line of said base structure, at least one roller, means rotatably mounting said roller to extend between said side wall members on one side of the transverse center line of said base structure whereby said roller and said side wall members define at least three boundary sides of a pressurized gas supporting cushion under said base structure, and means for supplying pressurized gas to the area under said base structure defined by said roller and said side wall members, said pressurized gas supplying means comprising a downwardly directed nozzle opening extending transversely between said side wall members and adjacent to said roller but between said roller and the transverse center line of said base structure, and blower means for supplying pressurized gas to said nozzle opening so as to form a fluid curtain to minimize air loss between the upper surface of said roller and the bottom surface of said base structure.

2. A ground effect machine as recited in claim 1 further comprising a second roller, and means rotatably mounting said second roller to extend between said side wall members on the opposite side of said transverse center line from the first said roller, whereby said side wall members and said two rollers define the four boundary sides of a pressurized gas supporting cushion under said base structure.

3. A ground effect machine as recited in claim 2 wherein said rollers are hollow and formed from a flexible material and are inflated at a relatively low pressure.

4. A ground effect machine as set forth in claim 1 wherein said means rotatably mounting said roller comprises means pivotally mounted on said base structure for permitting pivotal movement of said roller upon encountering obstacles during translational movement of said base structure, and means for urging said roller toward its original position after passage over an obstacle.

5. A ground effect machine as recited in claim 1 wherein said means rotatably mounting said roller comprises two arms pivotally mounted to said base structure and extending downwardly adjacent the respective inner surfaces of said side wall members to the axial ends of said roller, and means for sealing the spaces defined between said arms and the inner surfaces of said side wall members.

6. A ground effect machine as recited in claim 1 wherein said side wall members are retractably mounted in said base structure, and means for adjusting said side wall members vertically relative to said base structure.

7. A ground effect machine as recited in claim 1 wherein said downwardly directed nozzle is formed in the lower edge of a hollow flexible member extending downwardly from said base structure to a point below the upper surface of said roller.

8. A vehicle as claimed in claim 1 wherein said roller comprises a main cylinder which may be inflated at least in part, and formed of impermeable flexible material, having coaxially disposed therein a second roller of flexible material.

References Cited by the Examiner
UNITED STATES PATENTS

| | | | |
|---|---|---|---|
| 3,027,860 | 4/1962 | Priest | 180—7 |
| 3,077,174 | 2/1963 | Cockerell | 180—7 |
| 3,189,115 | 6/1965 | Rethorst | 180—7 |
| 3,195,666 | 7/1965 | Lewis et al. | 180—7 |

BENJAMIN HERSH, *Primary Examiner.*

M. S. SALES, *Assistant Examiner.*